United States Patent
Feng et al.

(10) Patent No.: US 11,579,726 B2
(45) Date of Patent: Feb. 14, 2023

(54) TOUCH DEVICE, ELECTRONIC DEVICE AND DRIVING METHOD

(71) Applicants: BEIJING BOE DISPLAY TECHNOLOGY CO., LTD., Beijing (CN); BOE TECHNOLOGY GROUP CO., LTD., Beijing (CN)

(72) Inventors: Yilin Feng, Beijing (CN); Hong Yang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 298 days.

(21) Appl. No.: 16/959,243

(22) PCT Filed: Sep. 11, 2019

(86) PCT No.: PCT/CN2019/105359
§ 371 (c)(1),
(2) Date: Jun. 30, 2020

(87) PCT Pub. No.: WO2021/046751
PCT Pub. Date: Mar. 18, 2021

(65) Prior Publication Data
US 2021/0405846 A1   Dec. 30, 2021

(51) Int. Cl.
*G06F 3/041*  (2006.01)
*G06F 3/044*  (2006.01)

(52) U.S. Cl.
CPC ........ *G06F 3/04166* (2019.05); *G06F 3/0446* (2019.05); *G06F 3/04164* (2019.05)

(58) Field of Classification Search
None
See application file for complete search history.

(56) References Cited

U.S. PATENT DOCUMENTS

| | | | |
|---|---|---|---|
| 2010/0220075 A1* | 9/2010 | Kuo | G06F 3/0446 324/661 |
| 2014/0362030 A1 | 12/2014 | Mo et al. | |
| 2014/0362040 A1 | 12/2014 | Mo et al. | |
| 2015/0077390 A1 | 3/2015 | Kim et al. | |
| 2016/0140376 A1 | 5/2016 | Kremin et al. | |
| 2016/0195990 A1* | 7/2016 | Han | G06F 1/3262 345/173 |

(Continued)

FOREIGN PATENT DOCUMENTS

| CN | 103279246 | 9/2013 |
|---|---|---|
| CN | 103294320 | 9/2013 |

(Continued)

*Primary Examiner* — Krishna P Neupane
(74) *Attorney, Agent, or Firm* — Leason Ellis LLP

(57) ABSTRACT

A touch device, an electronic device and a driving method are provided. The touch device includes: a plurality of touch sensors arranged in an array; a plurality of touch lines connected to the plurality of touch sensors; and a controller connected to the plurality of touch lines, wherein the controller is configured to simultaneously send a plurality of first touch signals respectively to the plurality of touch sensors via the plurality of touch lines, and simultaneously receive via the plurality of touch lines a plurality of second touch signals generated by the plurality of touch sensors.

19 Claims, 9 Drawing Sheets

(56) References Cited

U.S. PATENT DOCUMENTS

2016/0349895 A1* 12/2016 Long ................. G06F 3/041
2018/0364858 A1    12/2018 Gray
2020/0249791 A1*  8/2020 Kim .................. G06F 3/0445

FOREIGN PATENT DOCUMENTS

CN    104461121    3/2015
CN    107077264    8/2017

* cited by examiner

TOUCH DEVICE, ELECTRONIC DEVICE AND DRIVING METHOD

CROSS-REFERENCE TO RELATED PATENT APPLICATIONS

This application is a U.S. National Stage Application under 35 U.S.C. § 371 of International Patent Application No. PCT/CN2019/105359 filed on Sep. 11, 2019, which is incorporated by reference in its entirety.

TECHNICAL FIELD

Embodiments of the present disclosure relate to a touch device, an electronic device, and a driving method.

BACKGROUND

A touch screen integrates both functions of display and touch, and can be classified into two categories according to the structure: one is an external-mounted touch screen; the other is an integrated touch screen. The integrated touch screen includes an on-cell touch screen and an in-cell touch screen. The in-cell touch screen is widely used due to the reason that it can reduce the overall thickness of the touch screen and the manufacturing cost of the touch screen.

SUMMARY

At least one embodiment of this disclosure provide a touch device, comprising: a plurality of touch sensors arranged in an array; a plurality of touch lines connected to the plurality of touch sensors; and a controller connected to the plurality of touch lines, and the controller is configured to simultaneously send a plurality of first touch signals respectively to the plurality of touch sensors via the plurality of touch lines, and simultaneously receive via the plurality of touch lines a plurality of second touch signals generated by the plurality of touch sensors.

For example, the touch device provided in the at least one embodiment of this disclosure further comprising: a plurality of modulators, wherein the plurality of modulators are connected to the plurality of touch lines in one-to-one correspondence, and the plurality of modulators are configured to respectively modulate the plurality of second touch signals.

For example, the touch device provided in the at least one embodiment of this disclosure further comprising: a plurality of adaptive control circuits, wherein the plurality of adaptive control circuits are respectively connected to the controller, and are respectively connected to the plurality of modulators in one-to-one correspondence, and the plurality of adaptive control circuits are configured to adaptively adjust, according to a preset signal-to-noise ratio, frequencies of the plurality of second touch signals that have been modulated respectively, to obtain adjusted frequencies of the plurality of second touch signals; and send the adjusted frequencies of the plurality of second touch signals to the controller.

For example, the touch device provided in the at least one embodiment of this disclosure, the controller is further configured to adjust, based on the adjusted frequencies of each of the second touch signals, frequencies of the first touch signal corresponding to the adjusted frequencies of each of the second touch signals, to obtain adjusted frequencies of each of the first touch signals; and send, based on the adjusted frequencies of each of the first touch signals, the plurality of first touch signals respectively to the plurality of touch sensors.

For example, the touch device provided in the at least one embodiment of this disclosure, the plurality of modulators are digital modulators, and are configured to digitize the plurality of second touch signals, respectively.

For example, the touch device provided in the at least one embodiment of this disclosure, the digital modulator comprises an oversampling circuit unit, a quantization coding circuit unit, and a noise shaping circuit unit; wherein the oversampling circuit unit is configured to oversample the plurality of second touch signals to obtain oversampled data; the quantization and coding circuit unit is configured to quantize and encode the oversampled data to digitize the plurality of second touch signals; and the noise shaping circuit unit is configured to shape low-frequency noise in the second touch signals that have been digitized into high-frequency noise.

For example, the touch device provided in the at least one embodiment of this disclosure a frequency of the oversampling is larger than Nyquist frequency.

For example, the touch device provided in the at least one embodiment of this disclosure the digital modulator further comprises a low-pass filter, and wherein the low-pass filter is configured to filter out the high-frequency noise obtained in the noise shaping circuit unit.

For example, the touch device provided in the at least one embodiment of this disclosure, further comprising a digital decimation filter, wherein the digital decimation filter is configured to decimate and reduce the frequencies of the second touch signals that have been filtered.

For example, the touch device provided in the at least one embodiment of this disclosure, each of the touch sensors comprises a single touch electrode, and the single touch electrode is a self-capacitance electrode.

For example, the touch device provided in the at least one embodiment of this disclosure, each of touch sensors comprises a first touch electrode and a second touch electrode; wherein one of the first touch electrode and the second touch electrode is a driving electrode and the other is a sensing electrode.

For example, the touch device provided in the at least one embodiment of this disclosure the first touch electrode has a hollow area, and at least part of the second touch electrode is disposed in the hollow area of the first touch electrode.

For example, the touch device provided in the at least one embodiment of this disclosure the first touch electrode is configured to receive a superimposed signal of a self-capacitance signal at a first frequency and a mutual capacitance signal at a second frequency, the second touch electrode is configured to receive the self-capacitance signal of the first frequency.

At least one embodiment of this disclosure provide an electronic device comprising the touch device provided in any embodiment of this disclosure.

At least one embodiment of this disclosure provide a driving method of the touch device, comprising: applying the first touch signals to the plurality of touch sensors simultaneously via the plurality of touch lines; and respectively receiving the second touch signals generated by the plurality of touch sensors, to determine a position of a touch point.

For example, the driving method provided in the at least one embodiment of this disclosure, when the touch device further comprises a plurality of modulators and a plurality of adaptive control circuits connected in one-to-one correspondence with the plurality of modulators, and the driving method further comprises: respectively denoising and digitizing the plurality of second touch signals generated during an (i−1)th scan process, based on a plurality of second touch signals generated during the (i−1)th scan process, by the modulators corresponding to the second touch signals respectively, adaptively adjusting the frequencies of the plurality of denoised and second touch signals that have been digitized respectively, according to a preset signal-to-noise ratios, by the plurality of adaptive control circuits, to obtain respectively the adjusted frequencies of the plurality of second touch signals generated in the (i−1)th scan process; and receiving the adjusted frequencies of the plurality of second touch signals generated during the (i−1)th scan process by the controller, and based on the adjusted frequencies of the plurality of second touch signals generated during the (i−1)th scan process, respectively adjusting the frequencies of the plurality of first touch signals during an i-th scan process, so as to respectively obtain the adjusted frequencies of the plurality of first touch signals, wherein i is an integer larger than 1.

For example, the driving method provided in the at least one embodiment of this disclosure, further comprising: respectively sending the plurality of first touch signals to the plurality of touch sensors based on the adjusted frequencies of the plurality of first touch signals.

For example, the driving method provided in the at least one embodiment of this disclosure, adaptively adjusting the frequencies of the plurality of denoised and second touch signals that have been digitized respectively, according to the preset signal-to-noise ratios, by the plurality of adaptive control circuits comprises: respectively setting preset signal-to-noise ratios for the plurality of second touch signals; and respectively obtaining the frequencies of the plurality of denoised and second touch signals that have been digitized generated during the (i−1)th scan process when the corresponding preset signal-to-noise ratio for each second touch signal is reached, so as to be the adjusted frequencies of the plurality of second touch signals respectively.

For example, the driving method provided in the at least one embodiment of this disclosure, the plurality of second touch signals generated during the (i−1)th scan process are respectively denoised and digitalized by a digital modulator.

For example, the driving method provided in the at least one embodiment of this disclosure, the plurality of second touch signals generated during the (i−1)th scan process are respectively denoised and digitalized by the digital modulator comprises: performing oversampling, quantization coding, and noise shaping on the plurality of second touch signals.

For example, the driving method provided in the at least one embodiment of this disclosure, the plurality of second touch signals generated during the (i−1)th scan process are respectively denoised and digitalized by the digital modulator further comprises: performing decimation and filtering on the plurality of second touch signals after noise shaping.

BRIEF DESCRIPTION OF THE DRAWINGS

In order to more clearly explain the technical solutions of the embodiments of the present disclosure, the drawings of the embodiments will be briefly introduced below. Apparently, the drawings in the following description only relate to some embodiments of the present disclosure, rather than limit the present disclosure.

DETAILED DESCRIPTION

Figure 1A:
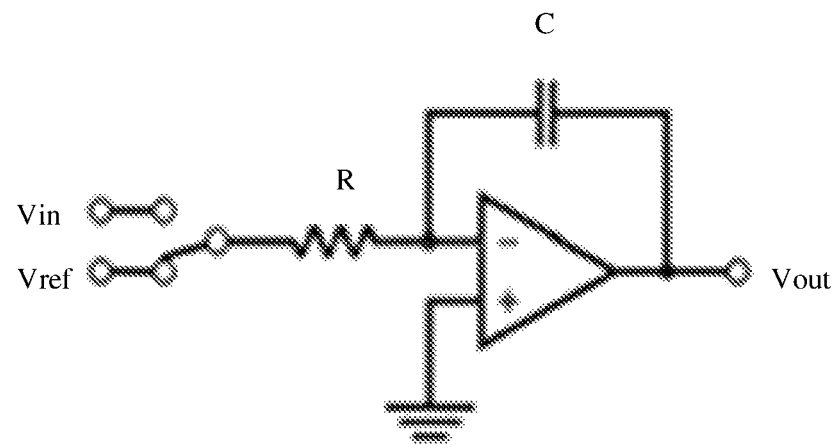
FIG. 1A is a schematic diagram of an integral analog-to-digital converter.

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

With the continuous development of touch technology, transmission rates of touch signals are getting ever faster, and requirements on reporting rates are getting even higher. Correspondingly, this requires signal converters to work faster with higher accuracy, so that requirement on the signal-to-noise ratio (SNR) of the touch signals is also getting increasingly higher. Therefore, the improvement of SNR is of great significance to the development and progress of touch technology. For example, on the one hand, improving the SNR of the touch signal is beneficial to improving the touch performance of electronic display devices such as mobile phones. For example, it allows a reporting point under a water droplet condition with a high SNR requirement (that is, a reporting point when there are water droplets on the touch screen). On the other hand, improving the SNR of touch signals is also beneficial to broaden the application fields of touch devices, for example, in the areas of active pen technology, gene sequencing technology or under-screen fingerprint recognition that require high SNR application. Therefore, how to effectively perform signal processing to improve the signal-to-noise ratio has become an urgent problem needed to be solved in the art.

For example, in the conventional touch technology, a scanning method adopted for the touch electrode array is a time divisional scanning method. For example, referring to FIG. 1C, for example, an analog signal generator 102 inputs a touch drive signal into a touch electrode array 10 row by row, and a receiving signal processor 101 receives a touch detection signal generated by the touch electrode array 10 in response to the touch drive signal of each row, so as to implement row-by-row scanning, and a touch position of a finger, a stylus, and the like on the touch electrode array can be determined according to the scan detection result. For example, in general, the processing of touch signals (for example, touch detection signals or touch drive signals) during the row-by-row scanning process is usually performed by an integral ADC (Analog-to-Digital Converter) as shown in FIG. 1A.

Figure 1B:
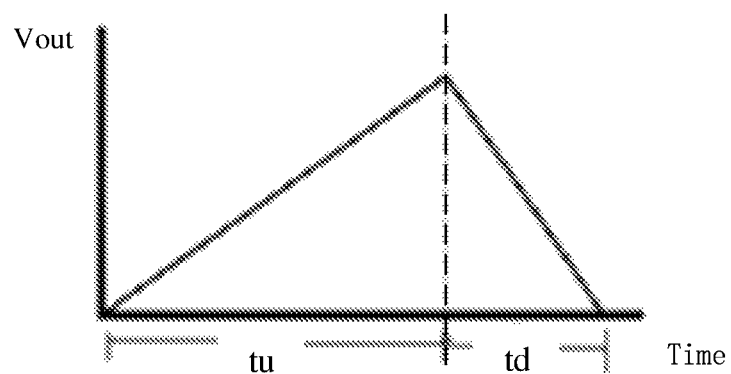
FIG. 1B is a schematic diagram of signal processing of an integral analog-to-digital converter shown in FIG. 1.
Figure 1C:
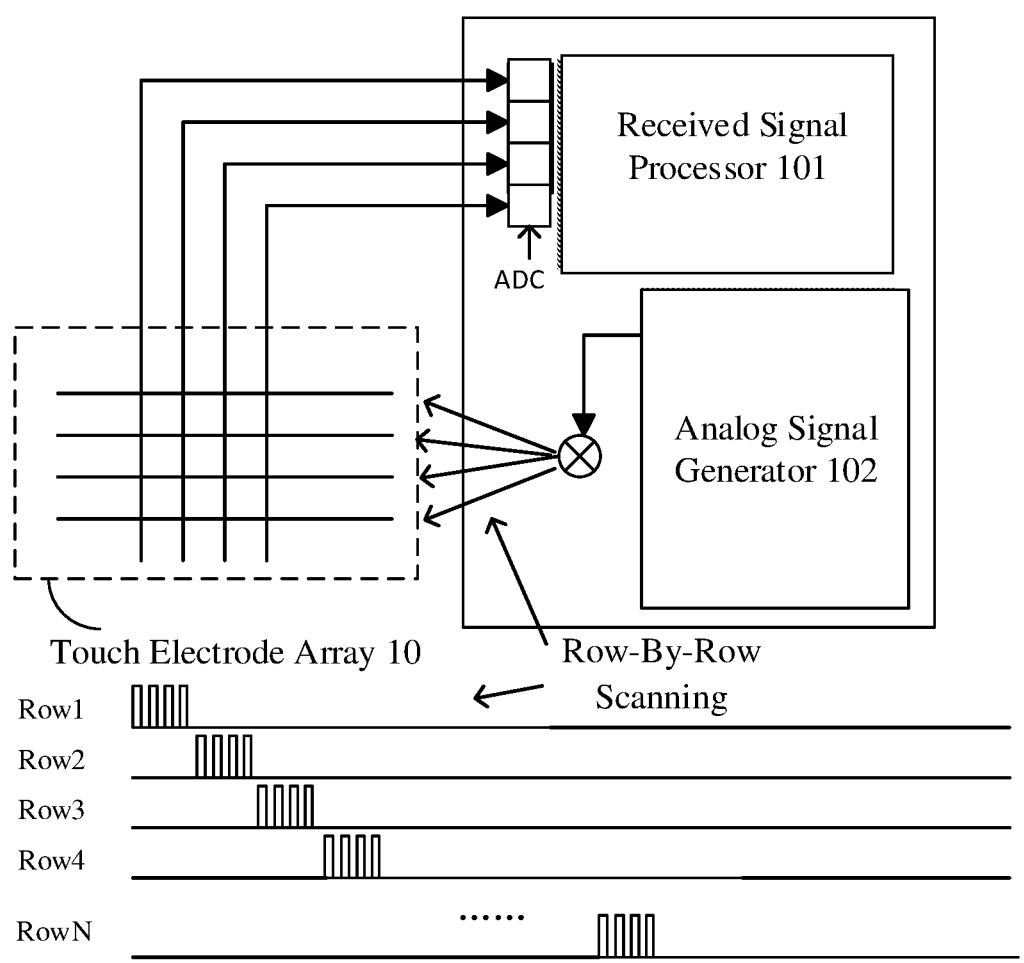
FIG. 1C is a schematic diagram of touch scanning.

For example, referring to FIG. 1A and FIG. 1B, an input voltage (for example, a touch signal) is input to an input terminal Vin of the integral ADC, and after the input voltage is being integrated for a period of time (for example, a rising time period tu), an inverted reference voltage is kept being input to a reference voltage terminal Vref until the integral ADC returns to zero. For example, the keeping time period is a falling time period td, and then the formula for the input voltage of the integral ADC is Vin=Vref*(td/tu). It can be seen that the resolution of the input signal of the integral ADC is only related to the reference voltage and the integration time (for example, tu and td), and it is difficult to achieve high-resolution conversion of the input signal. Therefore, the application field is subject to certain limitations. Moreover, there are many other problems with this integral ADC. For example, it is mainly suitable for solving data acquisition and intelligent instruments of medium-accuracy (such as medium-speed or low-speed), integrator tends to be saturated, because the wideband circuit noise of the integrator, the output zeroing capability of the comparator generated by accurate detection is limited, dielectric absorption affects the quality of the integrated capacitor, and so on. These problems have caused certain restrictions on the product's touch performance.

The inventor also noticed that the signal-to-noise ratio of the touch signal generated based on the above-mentioned integral ADC and time divisional scanning is generally around 40-50 dB (decibel). The limitation of this signal-to-noise ratio will seriously affect the touch quality, and without an infrared sensor, it is insensitive to the position detection of small signals such as Hover.

In view of the above problems, at least one embodiment of the present disclosure provides a touch device, including: a plurality of touch sensors arranged in an array; a plurality of touch lines, connected to the plurality of touch sensors in one-to-one correspondence; a controller, connected to the plurality of touch lines, and the controller is configured to simultaneously send a plurality of first touch signals to the plurality of touch sensors separately via the plurality of touch lines, and simultaneously receive a plurality of second touch signals generated by the plurality of touch sensors via the plurality of touch lines.

Some embodiments of the present disclosure also provide an electronic device and a driving method corresponding to the touch device.

In the touch device provided by the above embodiment of the present disclosure, the controller controls the synchronous transmission of the first touch signal on all touch lines, so that the touch sensors of each row or column can be synchronously scanned, so as to reduce debugging cycles and costs. In addition, the first touch signal is applied to the plurality of touch lines simultaneously, so that the levels between adjacent touch lines are approximate, which can reduce a capacitance value of parasitic capacitance between adjacent touch lines, and can further improve the touch control accuracy and is beneficial for driving longer touch lines.

The embodiments and examples of the present disclosure will be described in detail below with reference to the drawings.

Figure 2A:
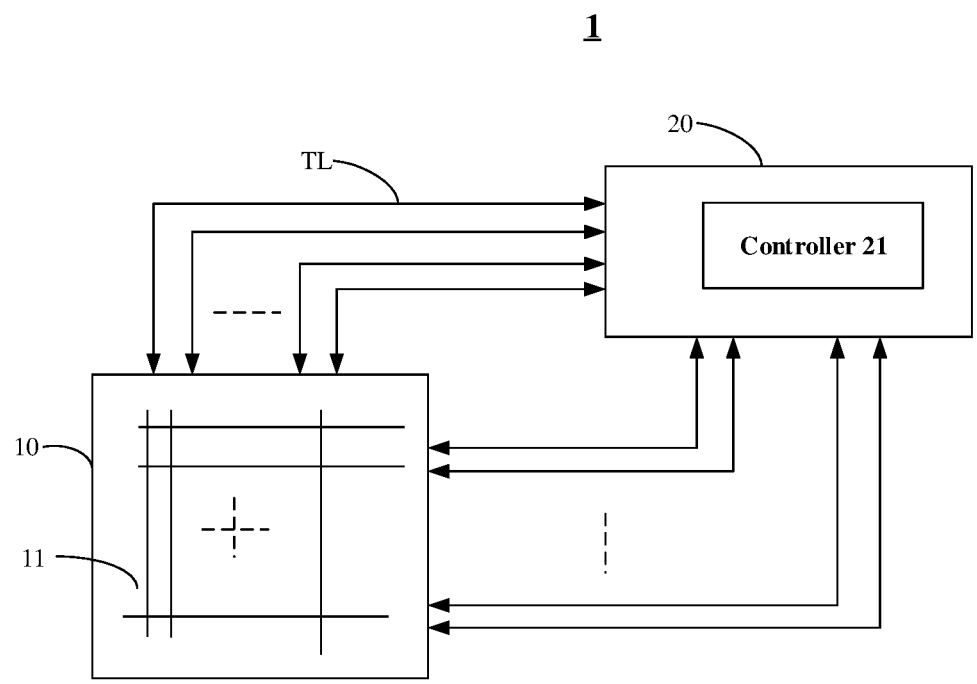
FIG. 2A is a schematic diagram of a touch device provided by at least one embodiment of the present disclosure.
Figure 2B:
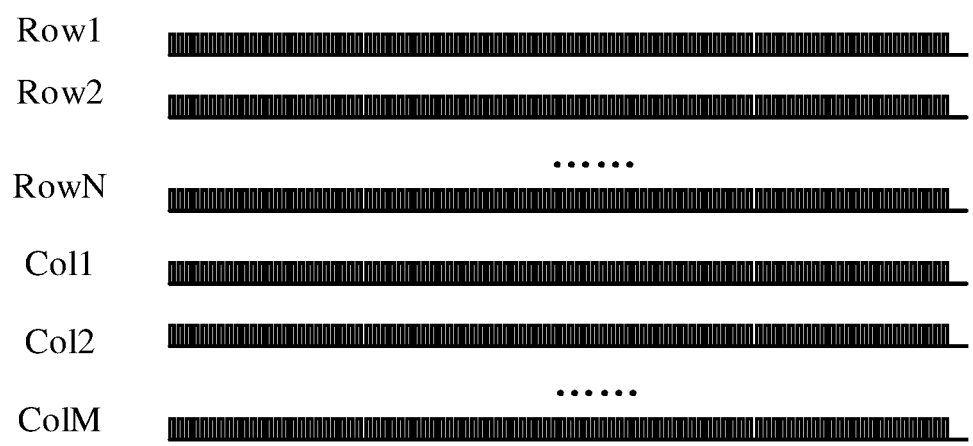
FIG. 2B is a timing diagram of a first touch signal applied to each touch line when the touch device shown in FIG. 2A is in operation.

FIG. 2A is a schematic diagram of a touch device provided by at least one embodiment of the present disclosure, and FIG. 2B is a timing diagram of a first touch signal applied to each touch line when the touch device shown in FIG. 2A is in operation. The touch device provided by at least one embodiment of the present disclosure will be described in detail below with reference to FIGS. 2A and 2B.

As shown in FIG. 2A, in some examples, the touch device 1 includes a plurality of touch sensors 11 (for example, including a touch electrode array 10) arranged in an array, a plurality of touch lines TL, and a controller 21. The touch device 1 further includes a touch display panel (not shown in the figure) and a driving circuit board 20. The drive circuit board 20 is disposed in a bonding area of the touch device 1 and is bonded with the touch display panel, to provide a first touch signal and the like to the touch display panel and receive a second touch signal generated in the touch electrode array, and perform analysis processing during a touch stage, and provide a data drive signal, a gate scan signal or a power supply voltage to the touch display panel during a display stage to drive the touch display panel for display.

For example, in some examples, the touch sensor 11 can be reused as a common electrode. For example, in the display stage, the touch sensor 11 is provided with a common voltage for display, so that the touch sensor 11 is reused as the common electrode 113 at this stage to drive a pixel unit to emit light; and in the touch stage, the touch sensor 11 is provided a touch drive signal to implement touch detection.

Therefore, in this embodiment, by driving the touch display panel in a time divisional manner, the touch sensor can be reused.

Of course, the touch display panel provided by the embodiments of the present disclosure can also be driven simultaneously, as long as it can implement corresponding functions, which is not limited in the embodiments of the present disclosure.

For example, a plurality of touch sensors 11 and a plurality of touch lines TL arranged in an array are disposed on the touch display panel. For example, the touch sensors 11 can be integrated under a glass substrate of the touch display panel, for example to form an in-cell touch device, or can be integrated on the glass substrate of the touch display panel, for example to form an external-mounted touch device, which is not limited in the embodiments of the present disclosure.

For example, the controller 21 is integrated on the driving circuit board 20. For example, the controller 21 can be various devices that can implement control functions. For example, the controller 21 can include a processor and a memory. The processor can be a central processing unit (CPU), a data signal processor (DSP), a field programmable gate array (FPGA), and other forms of processing units that have data processing capabilities and/or instruction execution capabilities, and can be a general-purpose processor or a dedicated processor, a processor based on X86 or ARM architecture and so on. The memory can include one or more computer program products, and the computer program product can include various forms of computer-readable storage media, such as volatile memory and/or non-volatile memory. Volatile memory can include, for example, random access memory (RAM) and/or cache memory (cache). The non-volatile memory can include, for example, read-only memory (ROM), hard disk, flash memory, and the like. One or more computer program instructions can be stored on the computer-readable storage medium, and the processor can execute the program instructions to implement the functions and/or other desired functions in the embodiments (implemented by the processor) of the present disclosure, such as synchronous scanning, and the like. Various application programs and various data can also be stored in the computer-readable storage medium, such as signal frequency and various data used and/or generated by the application programs.

For example, the plurality of touch lines TL are connected to the plurality of touch sensors 11 arranged in the array to transmit first touch signals (e.g., touch drive signals) to the plurality of touch sensors.

For example, the controller 21 is connected to the plurality of touch lines TL, and is configured to simultaneously and respectively send a plurality of first touch signals to the plurality of touch sensors 11 via the plurality of touch lines TL, and simultaneously receive a plurality of second touch signals generated by the plurality of touch sensors 11 via the plurality of touch lines TL, to implement synchronous touch scanning for the touch sensors in respective rows and columns.

Figure 6:
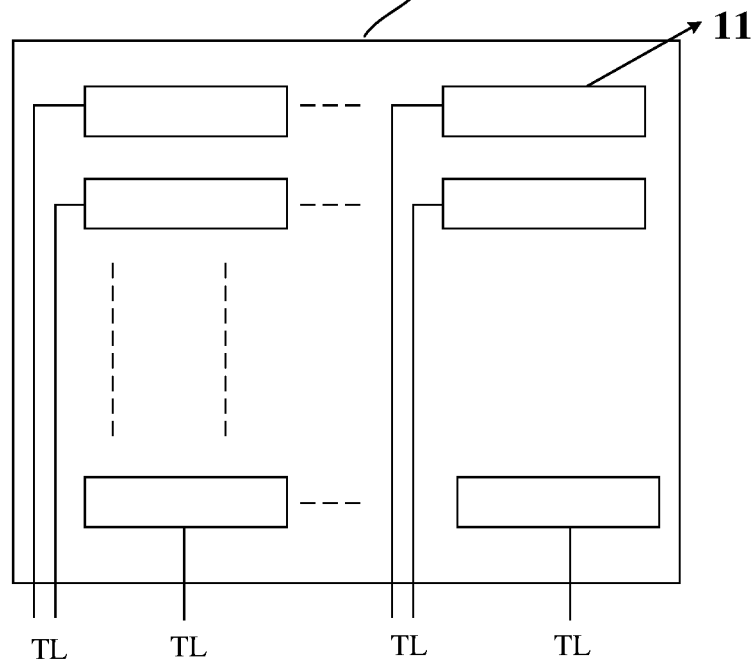
FIG. 6 is a schematic diagram of a touch sensor provided by at least one embodiment of the present disclosure.

For example, in some examples, as shown in FIG. 6, each touch sensor 11 can include a single touch electrode. For example, each touch electrode is connected to one touch line TL to implement the transmission of the first touch signal and the second touch signal. For example, in this example, the single touch electrode itself has a self-capacitance, and a touch position such as a finger, a stylus, or the like can be determined according to the change in the self-capacitance.

Figure 7:
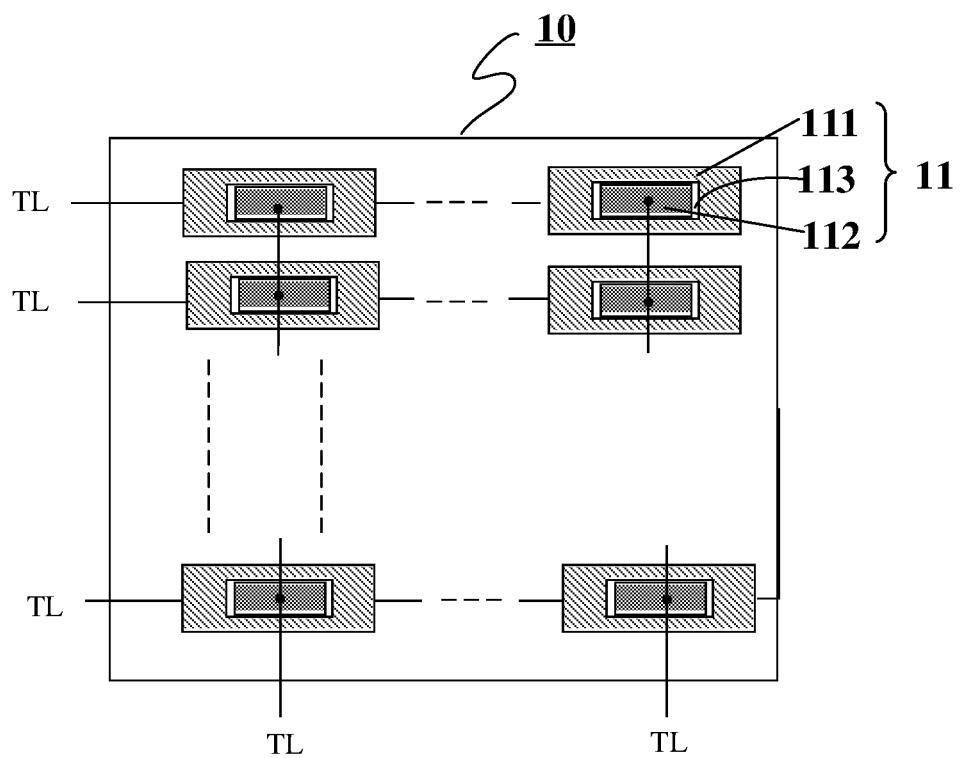
FIG. 7 is a schematic diagram of another touch sensor provided by at least one embodiment of the present disclosure.

For example, in some other examples, as shown in FIG. 7, each touch sensor 11 includes a first touch electrode 111 and a second touch electrode 112. For example, one of the first touch electrode 111 and the second touch electrode 112 is a driving electrode and the other is a sensing electrode.

For example, in some examples, the first touch electrode 111 has a hollow area 113, and at least part of the second touch electrode 112 is disposed in the hollow area 113 of the first touch electrode 111. In this example, in response to a touch operation, not only the mutual capacitance between the first touch electrode 111 and the second touch electrode 112 will change, but also the self-capacitance of the first touch electrode 111 and the second touch electrode 112 will also change, so that self-capacitance and mutual capacitance touch detection can be integrated to further improve touch accuracy.

Since the signal capacity of the self-capacitance of each touch electrode is high, the signal capacity of the mutual capacitance between the two touch electrodes is relatively low, but the position reporting is accurate (for example, no "ghost point" phenomenon), then in this example, by using a self-capacitance and mutual capacitance touch detection integrated structure to implement touch control, the advantages of both can be utilized, and touch sensitivity can be improved.

For example, in this example, as shown in FIG. 7, the plurality of first touch electrodes include, for example, N rows, and the plurality of second touch electrodes include, for example, M columns, where N and M are both integers larger than 1. The control electrode array 10 includes a grid of N rows and M columns. For example, the N rows of first touch electrodes 111 are connected to the N touch lines TL extending in a row direction (for example, a direction parallel to the gate line) to simultaneously receive N first touch signals (for example, Row1-RowN as shown in FIG. 2B), the M columns of second touch electrodes 112 are connected to M touch lines TL extending in a column direction (e.g., a direction perpendicular to the row direction) to simultaneously receive M first touch signals (For example, Col1-ColM as shown in FIG. 2B). As shown in FIG. 2B, the first touch signals Row1-RowN and the first touch signals Col1-ColM are simultaneously active levels. Thus, the synchronous scanning of the first touch electrodes 111 in the rows and the second touch electrodes 112 in the columns can be realized.

For example, in this example, the controller 21 is connected to the plurality of touch lines TL, and is configured to simultaneously send N first touch signals (for example, Row1-RowN as shown in FIG. 2B) to the N rows of first touch electrodes 111 and send M first touch signals (for example, Col1-ColM shown in FIG. 2B) to the M columns of second touch electrodes 112, respectively, to implement synchronous touch scanning in the row direction and the column direction. For example, the N rows of first touch electrodes 111 and the M columns of second touch electrodes 112 respectively generate corresponding second touch signals in response to the received first touch signals, the N+M touch lines simultaneously send the second touch signals to the controller 21, for example, send to a received signal processor (not shown) in the controller 21 to analyze and determine, for example, a touch position of a finger or a stylus according to the second touch signals. For example, the second touch signal includes the self-capacitance signal of each electrode and the mutual capacitance signal between the first touch electrode and the second touch electrode.

For example, in this example, although the respective first touch signals are sent out simultaneously, the first touch signal applied to the first touch electrodes in N rows and the first touch signal applied to the second touch electrodes in M columns are different. For example, the first touch signal applied to the first touch electrode is a superposition of a self-capacitance signal at a first frequency and a mutual capacitance signal at a second frequency, and the first touch signal applied to the second touch electrode is a self-capacitance signal at the first frequency, or vice versa, so as to implement a self-capacitance and mutual capacitance touch detection integration to improve touch accuracy. For example, the first frequency represents a frequency used to send a touch drive signal when performing touch detection based on the self-capacitance signal of each touch electrode itself; and the second frequency represents a frequency used to send a touch drive signal when performing touch detection based on the mutual capacitance signal between the first touch electrode and the second touch electrode.

Correspondingly, the second touch signal received by the second touch electrode 112 includes a superposition of a self-capacitance signal at a first frequency and a mutual capacitance signal at a second frequency. The second touch signal received by the first touch electrode 111 includes a self-capacitance signal at a first frequency. The self-capacitance signal and the mutual-capacitance signal can be separated according to different frequencies, and the approximate position of the touch point can be determined according to the signal capacity of the self-capacitance signal, and then an exact position of the touch point can be determined according to the mutual capacitance signal. Therefore, based on the self-capacitance and mutual capacitance touch detection integrated structure, the respective advantages of the self-capacitance and the mutual capacitance can be combined, so that the touch accuracy can be improved.

For example, since each row and each column of touch lines in the touch electrode array simultaneously sends the first touch signal and simultaneously receives the second touch signal, it is possible to determine the intersection point of the row and the column which have a self-capacitance changed, and thus determine the location of the touch point. The method of determining the touch point according to the change amount of the mutual capacitance is similar to this, which will not be elaborated herein.

For example, the first touch electrode 111 and the second touch electrode 112 can also be structures that only form mutual capacitance electrodes, that is, the first touch electrode 111 does not include the hollow area 113, which will not be elaborated herein. The embodiments of the present disclosure do not limit this.

It should be noted that in the following embodiments, the touch sensor shown in FIG. 7 is used as an example for description, and the embodiments of the present disclosure do not limit this.

In the embodiments of the present disclosure, the synchronous transmission of the first touch signal on all touch lines is controlled by the controller, which can realize synchronous scanning, frequency division multiplexing, which can reduce debugging cycles and costs. In addition, a first touch signal is simultaneously applied to the plurality of touch lines, the levels between adjacent touch lines are similar, which can reduce a capacitance value of parasitic capacitance between adjacent touch lines, and can further improve the touch control accuracy and is beneficial for driving longer touch lines.

Figure 3:
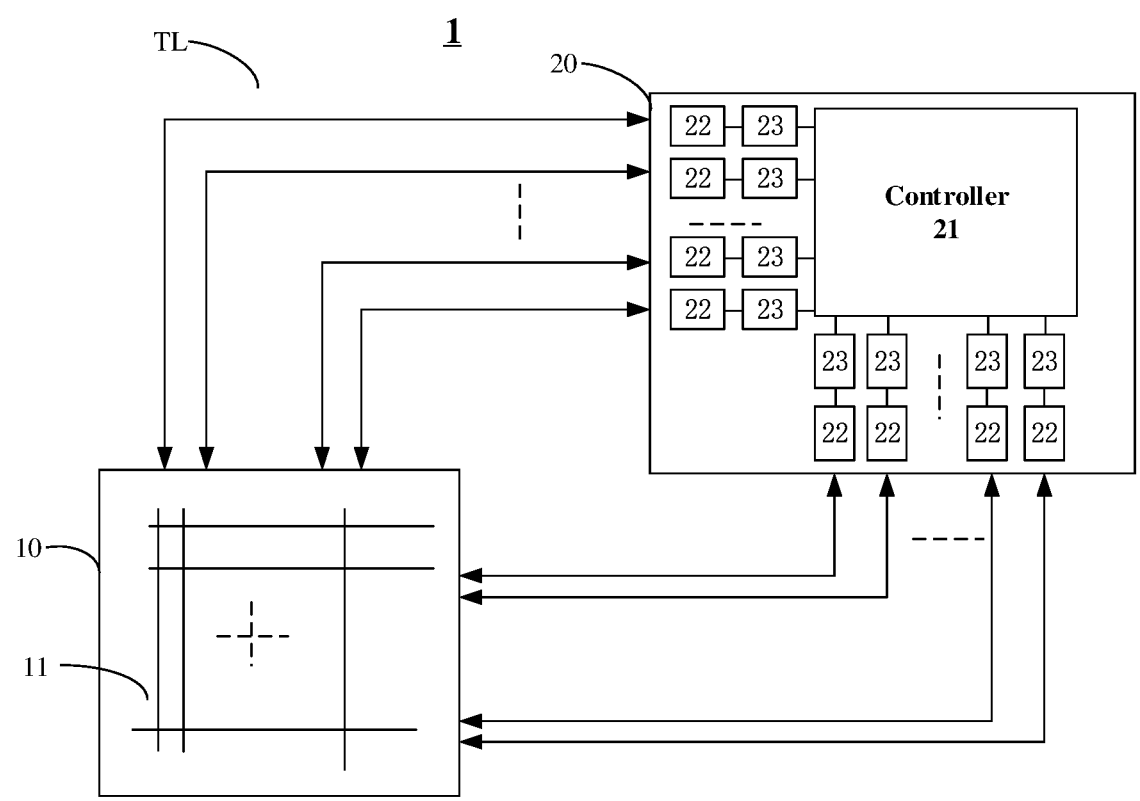
FIG. 3 is a schematic diagram of another touch device provided by at least one embodiment of the present disclosure.

FIG. 3 is a schematic diagram of another touch device provided by at least one embodiment of the present disclosure. For example, in some examples, as shown in FIG. 3, on the basis of the example shown in FIG. 2A, the touch device 1 further includes a plurality of modulators 22. For example, the plurality of modulators 22 are correspondingly connected to the plurality of touch lines TL one by one, and are configured to modulate the plurality of second touch signals respectively, so that the signals transmitted on respective touch lines can be individually modulated.

For example, each of the plurality of modulators 22 can be implemented as a digital modulator, and configured to digitize the plurality of second touch signals, respectively. For example, the digital modulator is a 1-bit (1-bit) sigma-delta (Σ Δ) modulator, which is not limited in the embodiments of the present disclosure.

Figure 4A:
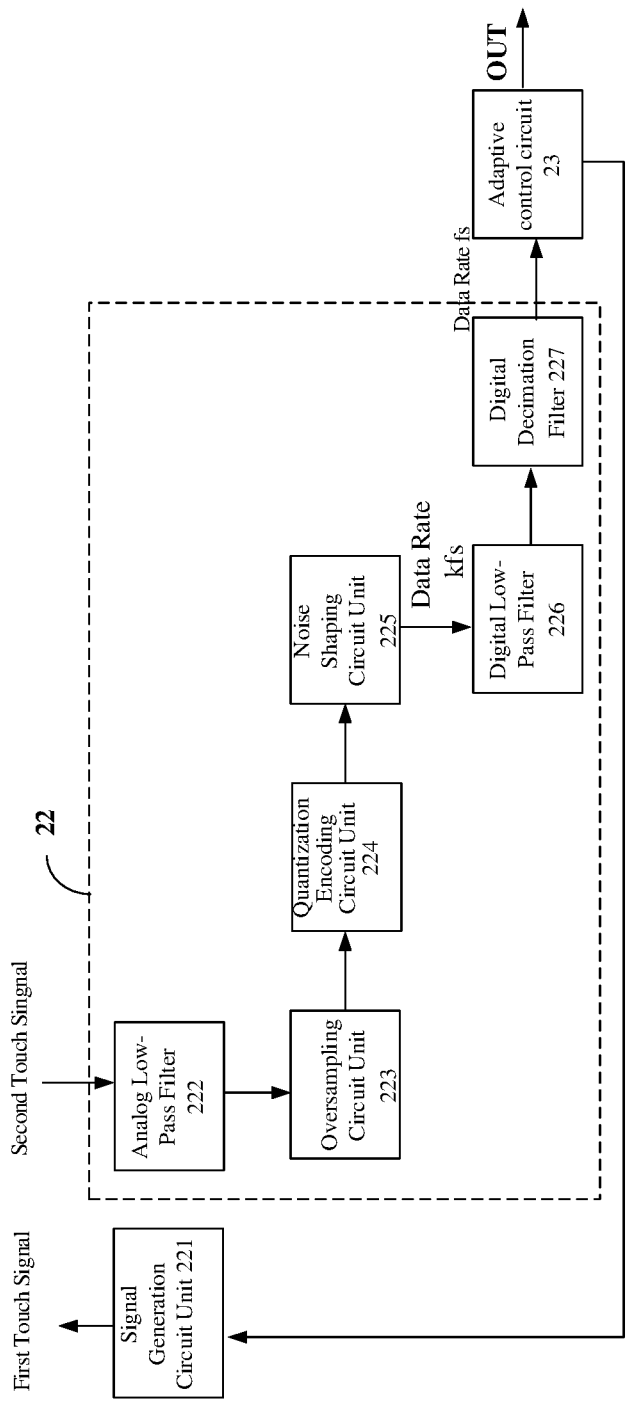
FIG. 4A is a schematic diagram of a digital modulator provided by at least one embodiment of the present disclosure.

FIG. 4A is a schematic diagram of a digital modulator provided by at least one embodiment of the present disclosure. For example, as shown in FIG. 4A, the digital modulator 22 further includes an analog low-pass filter 222. Before the second touch signals are oversampled, first the digital low-pass filter 222 filters out a part of the noise in the second touch signals, the analog low-pass filter is connected to an oversampling circuit unit 223 to input the analog signals (the second touch signals) having noise filtered to the oversampling circuit unit 223 to be oversampled.

For example, as shown in FIG. 4A, in some examples, the digital modulator 22 includes an oversampling circuit unit 223, a quantization encoding circuit unit 224, and a noise shaping circuit unit 225.

For example, the oversampling circuit unit 223 is configured to oversample the second touch signals (for example, as analog signals) to obtain oversampled data. For example, the frequency of oversampling is much higher than the Nyquist frequency.

For example, the quantization encoding circuit unit 224 is configured to quantize and encode the oversampled data to digitize the second touch signals, so that the second touch signals can be changed from analog signals to easily processed digital signals. For example, an incremental encoding method can be used, that is, encoding is performed according to a difference value between a previous value and a latter value in the quantized data. For specific operations, reference can be made to the relevant descriptions in the art, which will not be elaborated herein. The embodiments of the present disclosure do not limit this.

For example, the noise shaping circuit unit 225 is configured to shape low-frequency noise in the second touch signals that have been digitized into high-frequency noise.

For example, as shown in FIG. 4A, in some other examples, the digital modulator 22 further includes a low-pass filter 226, for example, the low-pass filter is a digital low-pass filter configured to filter out high-frequency noise obtained in the noise shaping circuit unit 225.

For example, the noise shaping circuit unit 225 can move the noise at a low frequency to a high frequency, for example, to concentrate more noise in the range of fs/2-Kfs/2. In this way, the noise is no longer evenly distributed. Since the noise is moved to high frequencies, the noise within the bandwidth of the signal transmission becomes very little, and the noise outside the useful frequency band becomes more. At this time, after passing through the subsequent low-pass filter 226, the low-frequency useful signals can be retained, and the high-frequency quantization noise is filtered out, thereby avoiding signal aliasing when a digital decimation filter 227 performs decimation. Aliasing will reduce the signal-to-noise ratio within the bandwidth.

For example, in some other examples, the touch device 1 further includes a digital decimation filter 227. For example, the digital decimation filter 227 is configured to decimate the filtered and digitized data signals to lower the frequency thereof, for example, perform 1/k decimation, thereby reducing the sampling frequency to about the Nyquist sampling frequency. For example, after passing through the oversampling circuit unit 223 and the noise shaping circuit unit 225, the rate of the modulator output signal is very fast, such as kfs. Such a fast rate cannot be directly employed, so the digital decimation filter 227 turns the high-speed signals which was changed from low-speed signals through the oversampling circuit unit to low-speed signals again.

For example, for a more detailed description of the sigma-delta modulator, reference can be made to related introductions in the art, which will not be elaborated herein.

For example, in some other examples, the touch device 1 further includes a plurality of adaptive control circuits 23 connected in one-to-one correspondence with the plurality of modulators 22.

For example, the adaptive control circuits 23 can be various devices that can implement an adaptive control function. For example, the adaptive control circuit 23 can include a processor and a memory. The processor can be a central processing unit (CPU), a data signal processor (DSP), a field programmable gate array (FPGA), and other forms of processing units that have data processing capabilities and/or instruction execution capabilities, and can be general-purpose processor or a dedicated processor, a processor based on X86 or ARM architecture and so on. The memory can include one or more computer program products, and the computer program product can include various forms of computer-readable storage media, such as volatile memory and/or non-volatile memory. Volatile memory can include, for example, random access memory (RAM) and/or cache memory (cache). The non-volatile memory can include, for example, read-only memory (ROM), hard disk, flash memory, and the like. One or more computer program instructions can be stored on the computer-readable storage medium, and the processor can execute the program instructions to implement the functions (implemented by the processor) and/or other desired functions in the embodiments of the present disclosure, such as acquiring the frequency of the second modulated signals, and so on. Various application programs and various data can also be stored in the computer-readable storage medium, such as a preset signal-to-noise ratio and various data used and/or generated by the application programs.

For example, the adaptive control circuit 23 mainly includes a state predictor, an adaptive law, a controlled object, a low-pass filter, and a control law. The design of the adaptive control circuit 23 mainly realizes the adaptive adjustment of the frequency of the second touch signals through the design of the state predictor, the adaptive law and the control law. For the specific working principle of the adaptive control circuit 23, reference can be made to related descriptions in the art, details of which will not be elaborated herein.

For example, any optimization algorithm can be used to complete the function of the adaptive control circuit 23, that is, self-learning based on the digital signals output by the modulator, modifying the weights in the control law according to the learning data, establishing a mathematical model and using SNR standards (such as, preset signal-to-noise ratio) as a termination condition, outputting the signal that meets the condition to the next module (for example, to the signal generation circuit unit 221), and the signal that does not meet the condition will continue to enter the learning loop process.

In the following, taking a single neuron PID adaptive algorithm as an example, description will be given to processing digital signals, establishing a mathematical model, and applying a single neuron PID adaptive algorithm to implement optimization, to obtain an optimal model in the control law.

Figure 4B:
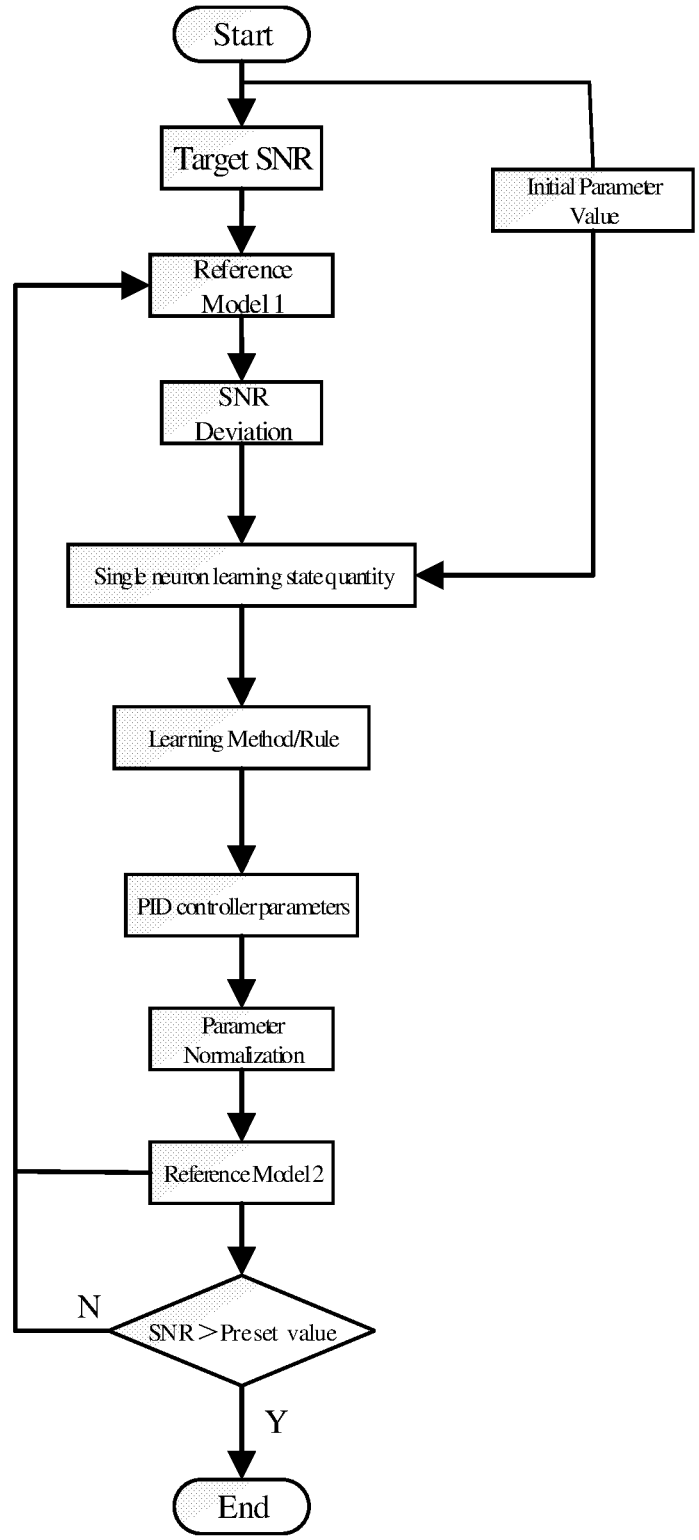
FIG. 4B is a flowchart of adaptive learning of an adaptive control circuit provided by at least one embodiment of the present disclosure.

As shown in FIG. 4B, the adaptive learning process of the adaptive control circuit 23 mainly includes: first setting initial parameter values of a target SNR and the adaptive control circuit 23, and the target SNR is referred to as a preset signal-to-noise ratio. For example, the preset signal-to-noise ratio is a signal-to-noise ratio set in advance which the touch display panel is required to achieve according to actual requirements. A SNR deviation of the digital signal output from the modulator 22 is obtained based on a reference model 1 (e.g., a PID controller), and based on the SNR deviation, single neuron learning state quantity (having the above initial parameter values), learning rules (e.g., using unsupervised Hebb learning rules, supervised Delta learning rules or supervised Hebb learning rules, and the like, which is not limited in the embodiments of the present disclosure), and other parameters for modulating the PID controller, the modulated parameters are normalized, thereby a reference model 2 is obtained, and the reference model 2 is taken as the reference module 1 to proceed to train the PID control parameters. At the same time, it is determined whether the signal-to-noise ratio of the modulated signal obtained based on the PID controller with the modulated parameters is larger than a preset value (for example, it can be a value of the preset signal-to-noise ratio). If so, the signal is outputted to the signal generation circuit unit 221 for example, to modulate the frequency of the first touch signal. If not so, the process returns to the reference model 1 and proceeds to train the reference model 1 (that is, the reference model 2 obtained during the previous training process) until the reference model (that is, the optimal model) satisfying the condition that the SNR is larger than the preset value is obtained and the frequency of the digital signal obtained based on the optimal model is obtained.

For example, the single neuron model in the single neuron adaptive PID controller can use a single neuron model in the art, which will not be elaborated herein.

For example, the plurality of adaptive control circuits 23 are also connected to the controller 21, and are configured to adaptively adjust the frequencies of a plurality of second touch signals that have been modulated according to the preset signal-to-noise ratio, to obtain the adjusted frequencies of the second touch signals; and send the adjusted frequencies of the second touch signals to the controller 21.

For example, according to actual needs or different noises at different touch lines of the touch display panel, corresponding preset signal-to-noise ratios are set respectively for the touch signal transmitted on each touch line.

For example, the touch device 1 includes N+M modulators 22 and N+M adaptive control circuits 23, which are connected in one-to-one correspondence with N+M touch lines TL, so that the touch signal transmitted on each touch line TL can be adjusted individually.

For example, the adaptive control circuit 23 adjust the frequencies of a plurality of first touch signals during the current touch scan process according to the plurality of second touch signals generated during the last touch scan process. For example, the frequency of the self-capacitance signal or the frequency of the mutual capacitance signal in the touch signal in the n-th (n is an integer larger than 1 and equal to N) row touch lines or the m-th (m is an integer larger than 1 and equal to M) column touch lines is adjusted correspondingly. For example, in some examples, a preset signal-to-noise ratio is set for adjusting the frequency of the self-capacitance signal in the second touch signal, and another preset signal-to-noise ratio is set for adjusting the frequency of the mutual capacitance signal in the second touch signal, thereby allowing adjusting separately, to achieve the optimal signal-to-noise ratio. The adjusted frequency of the second touch signal is the sum of the adjusted frequency of the self-capacitance signal and the adjusted frequency of the mutual capacitance signal.

For example, the operation of the plurality of modulators 22 and the adaptive control circuit 23 is as follows.

For example, based on a plurality of second touch signals generated during the (i−1)th scan (i is an integer larger than 1), the plurality of second touch signals generated during the (i−1)th scan are respectively denoised and digitized through corresponding modulators thereof.

For example, based on the adaptive modulators 23, the frequencies of the plurality of denoised and second touch signals that have been digitized are adaptively adjusted according to the preset signal-to-noise ratios respectively, to obtain respectively the adjusted frequencies of the plurality of second touch signals generated in the (i−1)th scan process. For example, the preset signal-to-noise ratios of the plurality of second touch signals are respectively set. For example, the preset signal-to-noise ratios can be determined according to actual needs, which is not limited in the embodiments of the present disclosure. For example, the frequency of the denoised and digitized second touch signal generated during the (i−1)th scan when it reaches its corresponding preset signal-to-noise ratio is obtained and used as the adjusted frequency of the second touch signal. For example, the adaptive control circuit 23 feeds back the obtained adjusted frequency of the second touch signal to the controller 21, so that the controller 21 can adjust the frequency of the corresponding first touch signal based on the adjusted frequency of the second touch signal.

For example, the controller 21 receives the adjusted frequencies of the plurality of second touch signals generated during the (i−1)th scan, and based on the adjusted frequencies of the plurality of second touch signals generated during the (i−1)th scan, the frequencies of the plurality of first touch signals during the i-th scan are respectively adjusted, so as to obtain the adjusted frequencies of the plurality of first touch signals respectively.

For example, the controller 21 includes a signal generation circuit unit 221 configured to generate, for example, a first touch signal and based on the adjusted frequencies of the plurality of first touch signals, send the first touch signal at a corresponding frequency to a corresponding touch line TL.

For example, in a high-order all-digital touch signal modulation, an X-order signal transfer function and noise transfer function are respectively:

$$S_Z = Z^{-X} \tag{1}$$

$$N(z) = (1 - Z^{-1})^X \tag{2}$$

Therefore, the maximum signal-to-noise ratio of the X-order modulator is:

$$SNR_M = 6.02N + 1.76 + 10(2X+1)\log^{OSR} - 10\log\frac{\Pi^{2X}}{2X+1} \tag{3}$$

where $SNR_M$ represents the maximum signal-to-noise ratio, X represents the order of the modulator, N represents the number of bits, and OSR represents the oversampling rate.

It can be seen from the above formula that the signal-to-noise ratio of the X-order modulator is related to the number of bits N, the modulator order X, and the oversampling rate OSR. For example, as the number of bits is increased by 1, the signal-to-noise ratio will be increased by 6 dB; and as the oversampling rate is increased by 1 time, the signal-to-noise ratio will be increased by 3+6XdB, and the resolution will be increased by 0.5+X bits per octave.

For example, in this embodiment, each touch line is controlled by a separate modulator, which can have the frequency adaptively adjusted in real time and avoid high-noise frequency bands. Thereby it can increase the signal-to-noise ratio to, for example, more than 80 dB, thus effectively improving touch performance.

In addition, in the embodiments of the present disclosure, all-digital touch signal modulation is accomplished through oversampling, noise shaping, digital filter adaptive real-time frequency modulation, and so on, by suppressing quantization errors in the signal band, the dynamic range of the system can be improved, high accurate data acquisition can be realized, the signal-to-noise ratio can be increased, and small signal processing capabilities can be improved. It can achieve close-range position sensing without infrared sensors, and the integrated digital modulator can reduce the size of the drive circuit board, which is beneficial to the narrow bezel design of the touch device.

Figure 5:
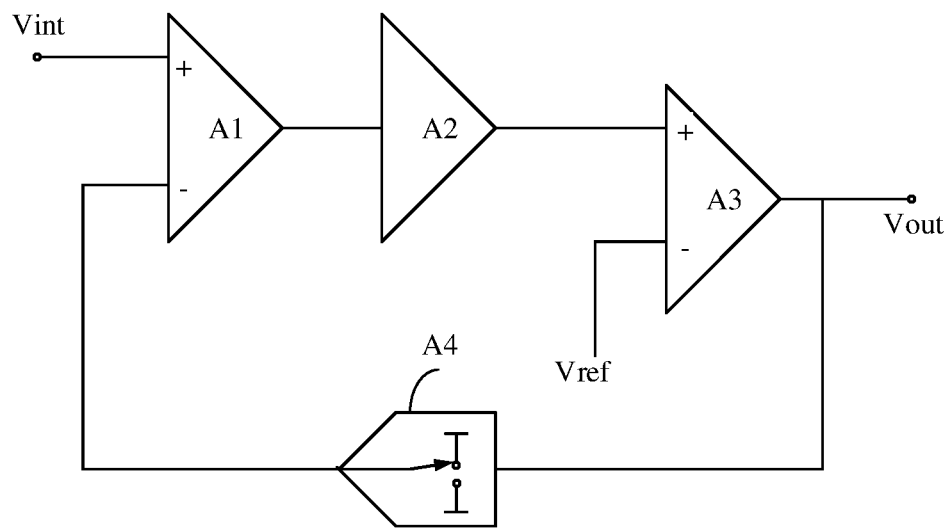
FIG. 5 is a schematic structural diagram of a digital modulator provided by at least one embodiment of the present disclosure.

FIG. 5 is a schematic structural diagram of a digital modulator provided by at least one embodiment of the present disclosure. For example, as shown in FIG. 5, the digital modulator includes a difference amplifier A1, an integrator A2, a comparator A3, and a digital-to-analog converter A4.

For example, in some examples, the comparator A3 is a 1-bit ADC, which is not limited in the embodiments of the present disclosure.

For example, the oversampling circuit unit 223, the quantization coding circuit unit 224, and the noise shaping circuit unit 225 in the digital modulator 22 shown in FIG. 4A can be implemented by the difference amplifier A1 to the digital-to-analog converter A4 in FIG. 5, accordingly the digital processing of the signal is achieved, the specific process can refer to the relevant description in the art, which will not be elaborated herein.

It should be noted that, for clarity and conciseness, the embodiments of the present disclosure do not provide all the components of the touch device 1. In order to realize the basic functions of the touch device 1, those skilled in the art can provide and set other structures not shown according to specific needs, which are not limited by the embodiments of the present disclosure.

Figure 9:
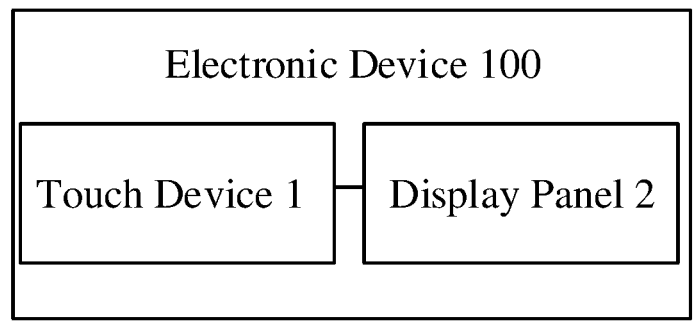
FIG. 9 is a schematic diagram of an electronic device provided by at least one embodiment of the present disclosure.

At least one embodiment of the present disclosure also provides an electronic device. FIG. 9 is a schematic diagram of an electronic device provided by at least one embodiment of the present disclosure. For example, as shown in FIG. 9, the electronic device 100 includes the touch device 1 and the display panel 2 provided by any embodiment of the present disclosure. For example, the touch device 2 can be a touch device as shown in FIG. 2A or FIG. 3.

For example, the touch sensor 11 in the touch device 1 can be integrated under the glass substrate of the display panel 2, for example to form an in-cell touch device, or can be integrated on the glass substrate of the display panel 2, for example to form an external-mounted touch device, which is not limited by the embodiments of the present disclosure.

For example, in some examples, the touch sensor 11 can be reused as a common electrode. For example, in the display stage, the touch sensor 11 is provided with a common voltage for display, so that the touch sensor 11 is reused as the common electrode 113 at this stage to drive a pixel unit in the display panel 2 to emit light; in the touch stage, the touch sensor 11 is provided a touch drive signal to implement touch detection.

Therefore, in this embodiment, by driving the touch display panel in a time divisional manner, the touch sensor can be reused.

For example, the electronic device can be any device such as a mobile phone, a tablet computer, a notebook computer, an e-book, a game console, a television, a digital photo frame, a navigator, or any combination of electronic devices and hardware, which is not limited in the present disclosure.

It should be noted that, for clarity and conciseness, the embodiments of the present disclosure do not provide all the constituent units of the electronic device 100. In order to realize the basic functions of the electronic device 100, those skilled in the art can provide and set other structures not shown according to specific needs, which are not limited by the embodiments of the present disclosure.

For the technical effect of the electronic device 100 provided by the above embodiment, reference can be made to the technical effect of the touch device provided in the embodiment of the present disclosure, which will not be elaborated herein.

At least one embodiment of the present disclosure also provides a driving method for the touch device provided by any embodiment of the present disclosure.

Figure 8:
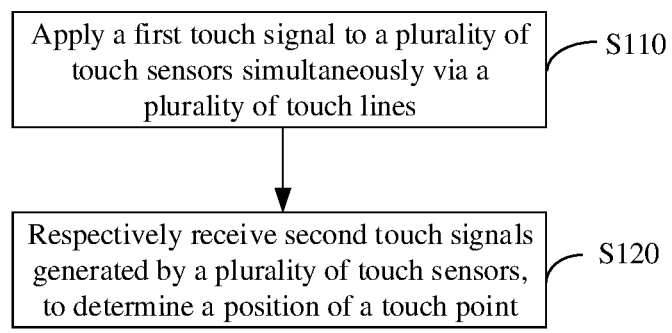
FIG. 8 is a flowchart of a driving method provided by at least one embodiment of the present disclosure.

FIG. 8 is a flowchart of a driving method provided by at least one embodiment of the present disclosure. As shown in FIG. 8, the driving method includes step S110 and step S120. The driving method provided by at least one embodiment of the present disclosure will be described in detail below with reference to FIG. 8.

Step S110, a first touch signal is applied to a plurality of touch sensors simultaneously via a plurality of touch lines.

Step S120, second touch signals generated by a plurality of touch sensors 11 are received respectively, to determine a position of a touch point.

For example, the driving method can be implemented by the touch device shown in FIG. 2A. For example, the touch sensor 11 in the touch device shown in FIG. 2A adopts the structure shown in FIG. 7, and simultaneously applies the first touch signals of N rows and M columns shown in FIG. 2B to the N rows of first touch electrodes 111 and M columns of second touch electrodes 112 shown in FIG. 7, so that synchronous scanning can be achieved.

For example, in this example, as shown in FIG. 7, the plurality of first touch electrodes include, for example, N rows of first touch electrodes, and the plurality of second touch electrodes include, for example, M columns of second touch electrodes, where N and M are both integers larger than 1. The control electrode array 10 includes a grid of N rows and M columns. For example, the N rows of first touch electrodes 111 are connected to N touch lines TL extending in the row direction (for example, parallel to the gate line) to receive N first touch signals (for example, Row1-RowN as shown in FIG. 2B), the M columns of second touch electrodes 112 are connected to M touch lines TL extending in the column direction (for example, a direction perpendicular to the row direction) to receive M first touch signals (for example, Col1-ColM as shown in FIG. 2B).

For example, in this example, the controller 21 is connected to a plurality of touch lines TL, and is configured to simultaneously send N first touch signals (for example, Row1-RowN as shown in FIG. 2B) to the N rows of first touch electrode 111, and send M first touch signals (for example, Col1-ColM as shown in FIG. 2B) to the M columns of second touch electrodes 112, respectively, to achieve synchronous touch scanning in the row direction and the column direction. For example, the N rows of first touch electrodes 111 and the M columns of second touch electrodes 112 respectively generate corresponding second touch signals in response to the first touch signal received, and the N+M touch lines simultaneously send the second touch signals to the controller 21, for example, send to a received signal processor in the controller 21 to analyze and determine a touch position of a finger or a stylus for example, according to the second touch signals. For example, the second touch signal includes the self-capacitance signal of each electrode and the mutual capacitance signal between the first touch electrode and the second touch electrode.

For example, in this example, although the respective first touch signals are sent out simultaneously, the first touch signal applied to the first touch electrodes in N rows and the first touch signal applied to the second touch electrodes in M columns are different. For example, the first touch signal applied to the first touch electrode is a superposition of a self-capacitance signal at a first frequency and a mutual capacitance signal at a second frequency, and the first touch signal applied to the second touch electrode is a self-capacitance signal at the first frequency, so as to implement a self-capacitance and mutual capacitance touch detection integration to improve touch accuracy. For example, the first frequency represents a frequency used to send a touch drive signal when performing touch detection based on the self-capacitance signal of each touch electrode itself; and the second frequency represents a frequency used to send a touch drive signal when performing touch detection based on the mutual capacitance signal between the first touch electrode and the second touch electrode.

For example, for a specific introduction, reference can be made to the description of FIG. 7, details of which will not be elaborated herein.

For example, in some examples, the touch device further includes a plurality of modulators 22 and a plurality of adaptive control circuits 23 connected in one-to-one correspondence with the plurality of modulators. For the description of the modulator 22 and the adaptive control circuits 23, reference can be made to the related descriptions of FIG. 2A, FIG. 4A and FIG. 5, which will not be elaborated herein.

For example, when the touch device further includes a plurality of modulators 22 and a plurality of adaptive control circuits 23 connected in one-to-one correspondence with the plurality of modulators, the driving method further includes:

Based on a plurality of second touch signals generated during the (i−1)th scan, the plurality of second touch signals generated during the (i−1)th scan are denoised and digitized respectively by corresponding modulators thereof;

Frequencies of the plurality of denoised and second touch signals that have been digitized are adjusted adaptively by the adaptive control circuits 23 according to a preset signal-to-noise ratios respectively, to obtain the adjusted frequencies of the plurality of second touch signals generated in the (i−1)th scan process; and The adjusted frequencies of the plurality of second touch signals generated during the (i−1)th scan is received by the controller 21. And based on the adjusted frequencies of the plurality of second touch signals generated during the (i−1)th scan, the frequencies of the plurality of first touch signals during the i-th scan is adjusted respectively, so as to obtain the adjusted frequencies of the plurality of first touch signals respectively.

For example, based on the adjusted frequencies of the plurality of first touch signals, the controller 21 sends the plurality of first touch signals to the plurality of touch sensors 11 respectively.

For example, in some examples, adaptively adjusting frequencies of the plurality of denoised and second touch signals that have been digitized by the adaptive control circuits 23 according to a preset signal-to-noise ratios respectively includes:

respectively setting preset signal-to-noise ratios for the plurality of second touch signals;

obtaining the frequencies of the plurality of denoised and second touch signals that have been digitized generated during the (i–1)th scan when they reach their corresponding preset signal-to-noise ratio, as the adjusted frequencies of the plurality of second touch signals.

For example, the above-mentioned modulator is a digital modulator, such as a 1-bit sigma-delta modulator, so that the plurality of second touch signals generated during the (i–1)th scan can be denoised and digitalized by the digital modulator. The embodiments of the present disclosure do not limit this.

For example, in some examples, denoising and digitizing the plurality of the second touch signals generated during the (i–1)th scan by a digital modulator, includes:

performing oversampling, quantization coding, and noise shaping on the plurality of second touch signals.

For example, in some other examples, denoising and digitizing, by the digital modulator, the plurality of second touch signals generated during the (i–1)th scan, respectively, further includes:

performing decimation and filtering on the plurality of second touch signals after noise shaping.

It should be noted that, for the detailed process of the digitizing process, reference can be made to the description of FIG. 4A, which will not be elaborated herein.

It should be noted that, in various embodiments of the present disclosure, the process of the driving method can include more or fewer operations, and these operations can be performed sequentially or in parallel. The driving method described above can be executed once or multiple times according to a predetermined condition.

For the technical effects of the driving method provided by the above embodiment, reference can be made to the technical effect of the touch device provided in the embodiments of the present disclosure, details of which will not be elaborated herein.

The following points need to be noted.

(1) The drawings of the embodiments of the present disclosure relate only to the structures related to the embodiments of the present disclosure, and other structures can refer to the general design.

(2) The embodiments of the present disclosure and the features in the embodiments can be combined with each other to obtain a new embodiment without conflict.

The above is only exemplary embodiments of the present disclosure and is not intended to limit the scope of protection of the present disclosure, which is determined by the appended claims.

What is claimed is:

1. A touch device, comprising:
a plurality of touch sensors arranged in an array;
a plurality of touch lines connected to the plurality of touch sensors;
a controller connected to the plurality of touch lines, wherein the controller is configured to simultaneously send a plurality of first touch signals respectively to the plurality of touch sensors via the plurality of touch lines, and simultaneously receive via the plurality of touch lines a plurality of second touch signals generated by the plurality of touch sensors; and
a plurality of adaptive control circuits, wherein the plurality of adaptive control circuits are respectively connected to the controller, and are connected to the plurality of touch lines in one-to-one correspondence, and the plurality of adaptive control circuits are configured to:
adaptively adjust, according to a preset signal-to-noise ratio, frequencies of the plurality of second touch signals that have been modulated respectively, to obtain adjusted frequencies of the plurality of second touch signals, and
send the adjusted frequencies of the plurality of second touch signals to the controller.

2. The touch device according to claim 1, further comprising:
a plurality of modulators, wherein the plurality of modulators are connected to the plurality of touch lines in one-to-one correspondence, and are respectively connected to the plurality of adaptive control circuits in one-to-one correspondence, and the plurality of modulators are configured to respectively modulate the plurality of second touch signals.

3. The touch device according to claim 2, wherein the plurality of modulators are digital modulators, and are configured to digitize the plurality of second touch signals, respectively.

4. The touch device according to claim 3, wherein the digital modulator comprises an oversampling circuit unit, a quantization coding circuit unit, and a noise shaping circuit unit, wherein
the oversampling circuit unit is configured to oversample the plurality of second touch signals to obtain oversampled data;
the quantization and coding circuit unit is configured to quantize and encode the oversampled data to digitize the plurality of second touch signals; and
the noise shaping circuit unit is configured to shape low-frequency noise in the second touch signals that have been digitized into high-frequency noise.

5. The touch device according to claim 4, wherein a frequency of the oversampling is larger than Nyquist frequency.

6. The touch device according to claim 4, wherein the digital modulator further comprises a low-pass filter, and
wherein the low-pass filter is configured to filter out the high-frequency noise obtained in the noise shaping circuit unit.

7. The touch device according to claim 6, further comprising a digital decimation filter, wherein the digital decimation filter is configured to decimate and reduce the frequencies of the second touch signals that have been filtered.

8. The touch device according to claim 1, wherein the controller is further configured to
adjust, based on the adjusted frequencies of each of the second touch signals, frequencies of the first touch signal corresponding to the adjusted frequencies of each of the second touch signals, to obtain adjusted frequencies of each of the first touch signals, and
send, based on the adjusted frequencies of each of the first touch signals, the plurality of first touch signals respectively to the plurality of touch sensors.

9. The touch device according to claim 1, wherein each of the touch sensors comprises a single touch electrode, and the single touch electrode is a self-capacitance electrode.

10. The touch device according to claim 1, wherein each of touch sensors comprises a first touch electrode and a second touch electrode; and
wherein one of the first touch electrode and the second touch electrode is a driving electrode while the other of the first touch electrode and the second touch electrode is a sensing electrode.

11. The touch device according to claim 10, wherein the first touch electrode has a hollow area, and at least part of the second touch electrode is disposed in the hollow area of the first touch electrode.

12. The touch device of claim 11, wherein the first touch electrode is configured to receive a superimposed signal of a self-capacitance signal at a first frequency and a mutual capacitance signal at a second frequency, and the second touch electrode is configured to receive the self-capacitance signal of the first frequency.

13. An electronic device comprising a touch device, wherein the touch device comprises:
a plurality of touch sensors arranged in an array;
a plurality of touch lines connected to the plurality of touch sensors;
a controller connected to the plurality of touch lines, wherein the controller is configured to simultaneously send a plurality of first touch signals respectively to the plurality of touch sensors via the plurality of touch lines, and simultaneously receive via the plurality of touch lines a plurality of second touch signals generated by the plurality of touch sensors; and
a plurality of adaptive control circuits, wherein the plurality of adaptive control circuits are respectively connected to the controller, and are connected to the plurality of touch lines in one-to-one correspondence, and the plurality of adaptive control circuits are configured to:
adaptively adjust, according to a preset signal-to-noise ratio, frequencies of the plurality of second touch signals that have been modulated respectively, to obtain adjusted frequencies of the plurality of second touch signals, and
send the adjusted frequencies of the plurality of second touch signals to the controller.

14. A driving method of a touch device, wherein the touch device comprises:
a plurality of touch sensors arranged in an array;
a plurality of touch lines connected to the plurality of touch sensors;
a controller connected to the plurality of touch lines, wherein the controller is configured to simultaneously send a plurality of first touch signals respectively to the plurality of touch sensors via the plurality of touch lines, and simultaneously receive via the plurality of touch lines a plurality of second touch signals generated by the plurality of touch sensors; and
a plurality of adaptive control circuits, wherein the plurality of adaptive control circuits are respectively connected to the controller, and are connected to the plurality of touch lines in one-to-one correspondence, and the plurality of adaptive control circuits are configured to:
adaptively adjust, according to a preset signal-to-noise ratio, frequencies of the plurality of second touch signals that have been modulated respectively, to obtain adjusted frequencies of the plurality of second touch signals, and
send the adjusted frequencies of the plurality of second touch signals to the controller,
wherein the driving method comprises:
applying the first touch signals to the plurality of touch sensors simultaneously via the plurality of touch lines; and
respectively receiving the second touch signals generated by the plurality of touch sensors, to determine a position of a touch point.

15. The driving method according to claim 14, wherein in a case where the touch device further comprises a plurality of modulators and a plurality of adaptive control circuits connected in one-to-one correspondence with the plurality of modulators, the driving method further comprises:
respectively denoising and digitizing the plurality of second touch signals generated during an (i−1)th scan process, based on a plurality of second touch signals generated during the (i−1)th scan process, by the modulators corresponding to the second touch signals respectively,
adaptively adjusting the frequencies of the plurality of denoised and second touch signals that have been digitized respectively, according to a preset signal-to-noise ratios, by the plurality of adaptive control circuits, to obtain respectively the adjusted frequencies of the plurality of second touch signals generated in the (i−1)th scan process; and
receiving the adjusted frequencies of the plurality of second touch signals generated during the (i−1)th scan process by the controller, and based on the adjusted frequencies of the plurality of second touch signals generated during the (i−1)th scan process, respectively adjusting the frequencies of the plurality of first touch signals during an i-th scan process, so as to respectively obtain the adjusted frequencies of the plurality of first touch signals,
wherein i is an integer larger than 1.

16. The driving method according to claim 15, further comprising:
respectively sending the plurality of first touch signals to the plurality of touch sensors based on the adjusted frequencies of the plurality of first touch signals.

17. The driving method according to claim 15, wherein adaptively adjusting the frequencies of the plurality of denoised and second touch signals that have been digitized respectively, according to the preset signal-to-noise ratios, by the plurality of adaptive control circuits, comprises:
respectively setting preset signal-to-noise ratios for the plurality of second touch signals; and
respectively obtaining the frequencies of the plurality of denoised and second touch signals that have been digitized generated during the (i−1)th scan process when the corresponding preset signal-to-noise ratio for each second touch signal is reached, so as to be the adjusted frequencies of the plurality of second touch signals respectively.

18. The driving method according to claim 15, wherein the plurality of second touch signals generated during the (i−1)th scan process are respectively denoised and digitalized by a digital modulator.

19. The driving method according to claim 18, wherein that the plurality of second touch signals generated during the (i−1)th scan process are respectively denoised and digitalized by the digital modulator comprises:

performing oversampling, quantization coding, and noise shaping on the plurality of second touch signals.

* * * * *